United States Patent [19]

Schulte et al.

[11] 4,405,539

[45] Sep. 20, 1983

[54] PROCESS FOR THE PRODUCTION OF PATTERNED TILES FROM THERMOPLASTIC SYNTHETIC RESINS

[75] Inventors: Herbert Schulte; Hans Brinkmann; Uwe Sommermeyer, all of Troisdorf, Fed. Rep. of Germany

[73] Assignee: Dynamit Nobel Aktiengesellschaft, Troisdorf, Fed. Rep. of Germany

[21] Appl. No.: 319,988

[22] Filed: Nov. 10, 1981

[30] Foreign Application Priority Data

Nov. 15, 1980 [DE] Fed. Rep. of Germany ....... 3043245

[51] Int. Cl.[3] .............................................. B29C 9/00

[52] U.S. Cl. ....................................... 264/77; 264/76; 264/145; 264/152; 264/153; 264/245

[58] Field of Search .................. 264/76, 77, 145, 152, 264/153, 245, 246, 247, 320

[56] References Cited

U.S. PATENT DOCUMENTS

| | | | |
|---|---|---|---|
| 2,625,712 | 1/1953 | Eaby | 264/76 |
| 3,078,510 | 2/1963 | Rowe | 264/246 |
| 3,202,738 | 8/1965 | Reichert | 264/77 |
| 3,835,212 | 9/1974 | Piacente | 264/76 |
| 4,158,533 | 6/1979 | Longinotti | 264/245 |

*Primary Examiner*—Donald E. Czaja
*Assistant Examiner*—W. Thompson
*Attorney, Agent, or Firm*—Antonelli, Terry & Wands

[57] ABSTRACT

A process for the production of patterned tiles from thermoplastic synthetic resins includes the steps of forming a length of crude sheet stock by compressing unicolored and/or differently colored or multicolored particulate material of thermoplastic synthetic resin; cutting off crude sheets from the sheet stock; punching segments out of the crude sheets; combining the segments from at least two crude sheets of differing colors into a panel so that the segments complement one another, and thereafter press-molding the segments to form an intarsia tile with the use of pressure and heat so that the segments are welded together along joints formed therebetween.

12 Claims, 6 Drawing Figures

1
2
3
4
5
6
7
8
9
10
11
13
14
17
18
19
20
21
22
23
A
B
11A
11B
11C
18a
24A
26
IV

PROCESS FOR THE PRODUCTION OF PATTERNED TILES FROM THERMOPLASTIC SYNTHETIC RESINS

This invention relates to a method for the production of patterned tiles from thermoplastic synthetic resins, especially suitable for floor coverings, wherein a length of crude sheet stock is produced by compressing, such as rolling and/or pressing, from unicolored and/or differently colored chips, granules, particles, cuttings, or the like of thermoplastic synthetic resins, and crude sheets are cut off from this sheet stock, and the crude sheet are subjected to a finishing operation to obtain the tiles, followed by an optional heat-treating, (annealing) step.

It is known to manufacture homogeneous floor coverings from thermoplastic synthetic resins by rolling and calendering, producing patterns by the use of differently colored particles of thermoplastic synthetic resins and scattering and incorporating such particles in the thermoplastic synthetic resin sheet.

The present invention is based on the object of providing intarsia tiles, starting with differently colored or patterned thermoplastic synethetic resin sheets.

The process of this invention attains this object by punching out segments from differently colored thermoplastic synthetic resin sheet blanks and combining the segments from at least two sheet blanks of differing colorations, so that the segments supplement each other, to form a panel, and thereafter pressing the segments with the use of pressure and heat into the intarsia tile, the segments being joined or bonded during this step to one another along the joints.

It is possible by the process of this invention to manufacture, in an economical, simple system, intarsia tiles in a great variety of patterns, from thermoplastic synthetic resins as they are required, in particular, for floor coverings which must meet high demands as to quality. The starting material in this procedure is a relatively inexpensive one, namely the so-called crude sheet stock (or sheet blank). Crude sheet stock is produced by rolling or pressing from small particles of thermoplastic synthetic resins, but the sheet stock is not as yet completely compacted and exhibits a rough or course surface. The particles for producing the crude sheet stock can consist of a material based on a vinyl polymer and/or copolymer of vinyl chloride, such as polyvinyl chloride containing plasticizers as well as optionally additional auxiliary ingredients and fillers, stabilizers, dye pigments, etc. The particles can also contain, at least in part, additionally other thermoplastic synthetic resins, such as acrylates, polyesters, ethylene/vinyl acetate, etc. The particles can also be provided with a colored and/or conductive casing, for example on the basis of coloring agents, carbon black pastes, or metallic pastes. All thermoplastic synthetic resins to be used with the invention should be well weldable with the use of heat and pressure to reach a homogenons product according the inventive process.

Starting with two differently colored crude sheets which can be color-matched, identical segments can be punched out according to punching templates or predetermined configurations, and the segments can be mutually exchanged in a positive-negative procedure for the two differently colored crude sheets, and combined correspondingly in mutual supplementation to a panel with intarsias. In this procedure for the production of intarsia tiles, any desired shaped and intarsias of different colorations can be jointed into a panel, there being practically no waste at all due to the mutual supplementation. This means that the crude sheets employed are processed entirely into intarsia tiles except for a marginal section or cutting. The intarsia panel, composed of segments, is thereafter press-molded in a single operating step with the use of pressure and heat into a homogeneous tile and, during this process, simultaneously heat-sealed along the joints of the segments. During this step, there is no flowing together and blurring of the contours so that intarsia tiles are created which are perfect in patterning and dimensionally accurate from a qualitative viewpoint.

An advantageous embodiment of the invention provides that the crude sheets are punched into a segment frame and loose segments. The segment frame and the loose segments being punched out of one crude sheet have no clearance to one another. For the further processing differently colored segment frames and loose segments are combined into a panel. A preferred version of the process according to this invention effects punching of the crude sheets into segments without any punching clearance. This, though, may have the disadvantage that during the combining of the loose segments and the segment frames into the panels its may arise some difficulties preferring to the fitting due to the lack of clearance between the segment frame and the segments. These problems are counteracted according to this invention by cooling the loose segments to be inserted in a segment frame to a temperature at least 5° C. lower than the temperature of the segment frame, and then combining the segments in the cooled state into the panel. This cooling of a part of the segments, namely, those which are loose and are inserted in a closed aperture resulting from the previous formation of another segment, has the result that these segments are shrunk by the cooling step, so that they can be conveniently assembled with clearance with the remaining segment parts to form the panel. During the subsequent heating step, the shrinkage is compensated for so that each segment is fitted dimensionally accurately into the inserted remaining segment parts.

In the production of the crude sheet stock by rolling or calendering, such crude sheets exhibit, in the rolling direction, a different shrinkage and expansion behavior than transversely to the rolling direction. In case of a random composing of the segments into the panels, this can cause difficulties. Therefore, it is proposed according to the invention to mark, i.e., indicate, the rolling direction on the crude sheets; it is possible in this way to compose the segments to be assembled into a panel in a simple way aligned in the rolling direction. Thus, the intarsia tile, in turn, exhibits the same shrinkage and expansion characteristic as a homogeneous crude sheet.

In a further development of the invention, it is especially advantageous to insert the segments in a press platen frame with lateral delimitation, to form the panel, and to cover same with a further press platen. In this way, the lateral frame of the lower press platen prevents flowing away of the panel during the pressing step. The loose segments and the segment frame are inserted in the press platen frame with a clearance to the press platen frame of about 0.5 to 5 mm, to make the handling easier.

The press-molding of the composed panels with the use of pressure and heat is preferably conducted in so-called multiple-platen presses. Such multiple-platen presses normally have predetermined dimensions of the press platens or press platen frames. The intarsia tiles produced therein can, however, be subsequently furthermore punched to a certain format depending on the desired size and shape of the intarsia tile.

The invention will be explained in greater detail below with reference to the drawings wherein.

Figures 1, 2, 3, 4:
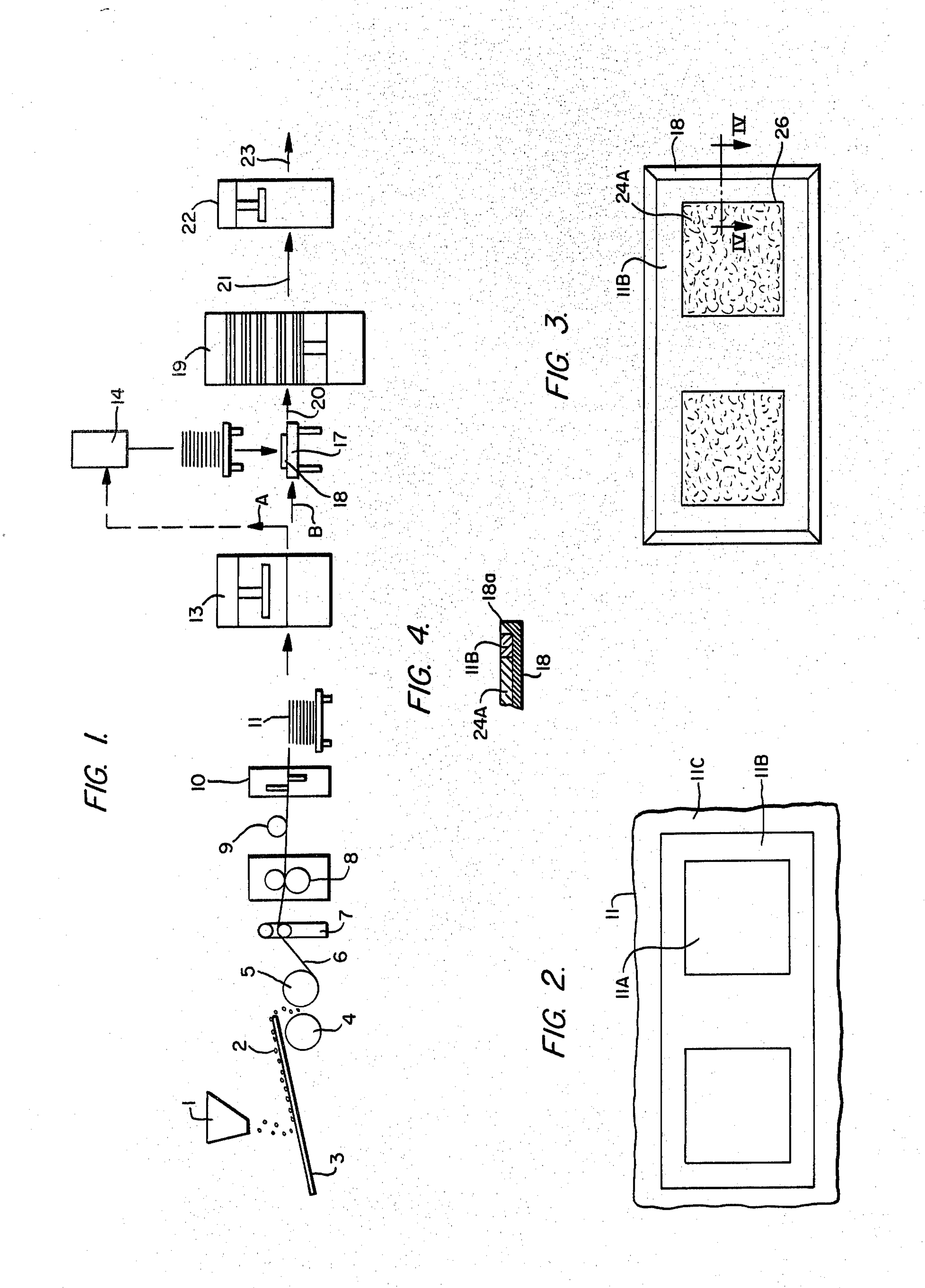
FIG. 1 shows schematically a flow diagram of the apparatus for manufacturing of the intarsia tiles by the process of this invention.
FIG. 2 shows a crude sheet with apertures resulting from punch-type cutting of segments therefrom.
FIG. 3 shows a press platen frame with segments inserted into a segment frame.
FIG. 4 is a cross-section taken along line IV—IV in FIG. 3.

FIG. 2 shows in a top view a crude sheet 11. In correspondence with the size of, for example, the press platen frames of a multiple-platen press, the segments 11A and 11B are punched out from this crude sheet 11, leaving the marginal section 11C. In this arrangement, 11B is a segment frame; whereas 11A represents loose segments. In the illustrated example, a segment frame 24B and segments 24A are additionally punched out from a second crude sheet 24, now shown herein, colored differently from the crude sheet 11.

FIG. 3 shows how, in a press platen frame 18, a segment frame 11B with segments 24A of a different color from frame 11B are combined into a panel and inserted therein. During the subsequent pressing step with the application of pressure and heat, the joints 26 between the segment frame 11B and the segments are welded (i.e., heat-sealed) together and simultaneously the crude sheet segments are densified and the panel is homogeneously pressed throughout in a uniform fashion.

FIG. 4 is a cross-section taken along line IV—IV in FIG. 3 showing the provision of the edge 18A as a lateral delimitation of the press platen frame 18.

Figure 5:
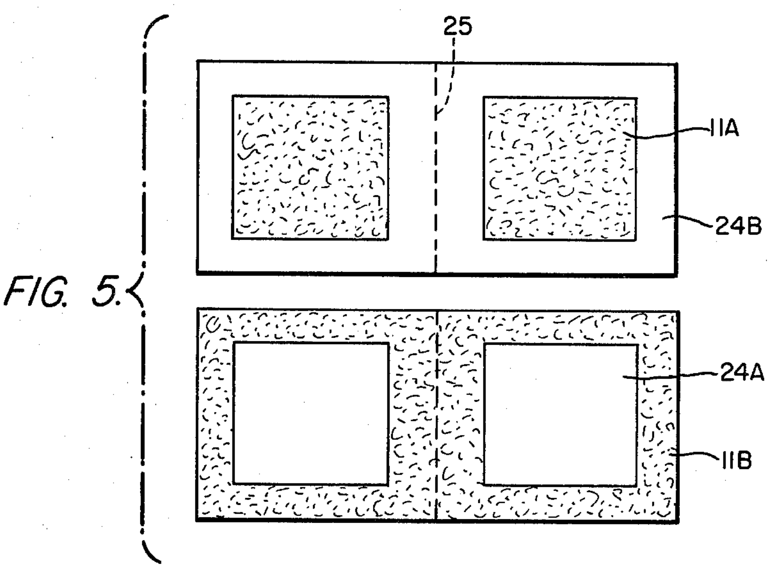
FIG. 5 shows two press-molded intarsia tiles which complement each other.

FIG. 5 shows schematically how intarsia tiles can be produced from two crude sheets 11, 24 of differing colorations by a corresponding mutual supplementation. Depending on the desired size of the intarsia tiles and the given size of the press platen frame, it is possible to additionally subdivide the finished press-molded intarsia panel along the illustrated cutting edge 25. It is also advantageous to provide the press-molded panel with a trimming cut.

Figure 6:
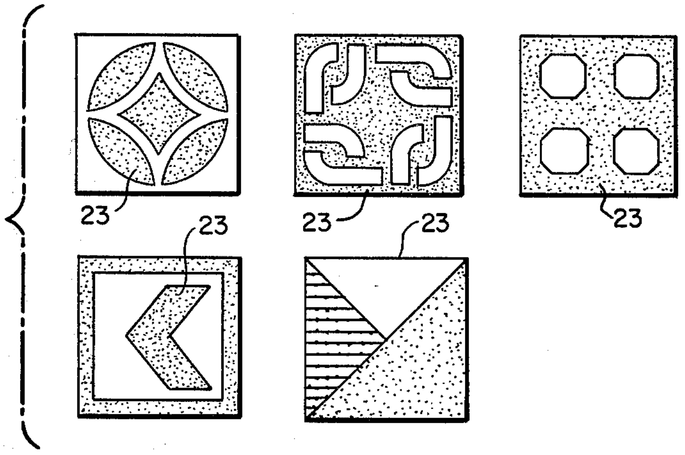
FIG. 6 shows various intarsia tile patterns.

Several possibilities for manufacturing intarsia patterns and intarsia tiles according to the process of this invention are shown in FIG. 6. For each of the illustrated intarsia tiles 23, a color reversal can be simultaneously produced. The external shape of the intarsia tile need not be rectangular; it can also be triangular, hexagonal, or of some other configuration, even an arcuate configuration which can be assembled into continuous surfaces.

The process of this invention will be further explained with reference to the schematic flow diagram according to FIG. 1. From a feeding unit 1, chips, cuttings, or the like denoted by 2 and made of unicolored or differently colored or multicolored thermoplastic synthetic resins are placed on the conveyor belt 3 and transported to the rolling mill 4, 5 for the production of the length of crude sheet stock. The crude sheet 6 is then fed, via take-off rolls, optionally to a smoothing unit or abrasive rolls and thereafter guided past the stamping device 9 to mark the rolling direction. This marking of the rolling direction serves for facilitating the insertion of the segments in the press platen frame. Subsequently, the individual crude slabs 11 are cut to size from the crude sheeting 6 at the transverse cutting device 10. It is also possible to convey prefabricated crude sheeting directly to the stamping device and the transverse cutter to cut off crude sheets to size. In any event, at this location crude sheets having differing patterns are produced, i.e., additional crude sheets 24, etc. These crude sheets are then fed to a punch device 13 effecting the punching out of the segments from the crude sheet. Strip steel cutting blades can be provided, for example, for the segment punch device.

The punched-out segments are separated after exiting from the punch device 13, namely, into the loose segments A which are fed to a cooling device 14, and into the remaining segments, especially segment frames B which are fed directly to an inserting means 17 for producing the intarsia panels. The segments A are cooled in the cooling device to about 5°–15° C., i.e., a temperature lying at least 5° C. below the room temperature at which the remaining segment parts B are stored. Thereafter, variously colored segments A, B are composed into the panel 20 at the inserting or assembling means 17, which means is provided with a press platen frame 18, covered on the topside with a further press platen, and thereafter conveyed to the multiple-platen press 19. When combining the individual segments into the panel, care must be taken that the rolling direction is maintained throughout. Due to the cooling of part of the segments, these shrink somewhat so that a minor amount of play exists between the uncooled segments B and the cooled segments A, due to the thus-provided clearance, whereby an easy assembly of the segments in the press platen frame is made possible. In the multiple-platen press 19, the thus-assembled panels 20 are then press-molded and welded (heat-sealed) together under pressures of between 30 and 100 $N/cm^2$ and temperatures of 150°–190° C. and pressing times of between 20 and 80 minutes. The applied pressures, temperatures, and pressing periods depend on the thickness of the panels and the materials employed.

Thereafter, the finished press-molded panels 21 are withdrawn from the press platen frames and fed to a format-punching press 22 for the final external shaping. The finished press-molded intarsia tile 23 is then subsequently furthermore temperature-treated, i.e., heat-treated or annealed to reduce residual stresses in the thermoplastic material.

What is claimed is:

1. A process for the production of patterned tiles from thermoplastic synthetic resins which comprises forming crude sheet stock from colored thermoplastic synthetic resin; cutting at least two crude sheets of different colors from said sheet stock; punching segments and a segment frame out of said crude sheets without providing clearance between the segment frame and the segments; cooling the segments to a temperature lower than the temperature of the segment frame to cause the segments to shrink; inserting the cooled segments from at least two crude sheets of different colors into a segment frame to provide a panel so that adjacent edges of the segments and the segment frame complement one another; and thereafter press-molding the segments and the segment frame to form an intarsia tile with the use of pressure and heat whereby the segments and the segment frame are welded together along joints formed at the adjacent edges therebetween.

2. A process for the production of patterned tiles from thermoplastic synthetic resins, especially for floor coverings, which comprises forming crude sheet stock by compressing unicolored and/or differently colored or multicolored chips, granules, particles, cuttings or the like particulate material of thermoplastic synthetic resins, cutting crude sheets from said sheet stock; punching a segment frame and loose segments out of said crude sheets without punching clearance between the segment frame and the loose segments; combining differently colored segment frame and loose segments into a panel so that the segments complement one another, the loose segments to be inserted in a segment frame being cooled to a temperature at least 5° C. lower than the temperature of the segment frame, and being asembled into the panel arrangement in the cooled state; and thereafter press-molding the segments to form an intarsia tile with the use of pressure and heat whereby the segments are welded together along joints formed therebetween.

3. A process according to claim 1, wherein the crude sheet stock is formed by compressing particulate material on a rolling calendar and the rolling direction is marked on the crude sheets.

4. A process according to claim 3, wherein the segments to be combined into a panel are assembled while being aligned in the rolling direction.

5. A process according to claim 1, wherein the segments are inserted in a press platen frame with a lateral delimitation, so that the segments form a panel, and the segments are covered by another press platen.

6. A process according to claim 1, wherein the press-molded intarsia tiles are punched to a certain format.

7. A process for the production of patterned tiles from thermoplastic synthetic resin which comprises forming at least two different colored sheets of colored thermoplastic synthetic resin; punching segment frames and loose segments out of said differently colored sheets without providing any punching clearance between the segment frames and the loose segments; cooling the loose segments to a temperature of at least 5° C. lower than the temperature of a segment frame in which the segments are to be inserted to form a panel arrangement; inserting the loose segments into the segment frame so that adjacent edges of the loose segments and the segment frame complement one another; and thereafter press-molding the loose segments and the segment frame to form an intarsia tile with the use of heat and pressure whereby the loose segments and the segment frame are welded together along joints formed at the adjacent edges therebetween.

8. A process according to claim 7, wherein the differently colored sheets are formed by compressing particulate material of thermoplastic resin of different colors on a rolling calender and the rolling direction is marked on the sheets.

9. A process according to claim 8, wherein the segments and segment frame to be combined into a panel are assembled while being aligned side-by-side in the rolling direction.

10. A process according to claim 7, wherein the loose segments and the segment frame are inserted into a press platen frame with a lateral delimitation so that the segments and the segment frame form a panel arrangement and then the segments and the segment frame are covered by another press platen.

11. A process for the production of patterned tiles for floor coverings from thermoplastic synthetic resin which comprises forming at least two differently colored raw sheets by compressing particulate material of differently colored thermoplastic synthetic resin; cutting portions of the raw sheets into a segment frame and into loose segments insertable into said segment frame without providing clearance between adjacent segments and the segment frame; combining the loose segments and a segment frame from at least two differently colored sheets to provide a panel arrangement wherein adjacent edges of loose segments and a segment frame complement one another, the loose segments to be inserted into the segment frame being cooled to a temperature at least 5° C. lower than the temperature of the segment frame and being arranged within the panel arrangement in the cooled state; and thereafter press-molding the segments and segment frame to form a patterned tile with the use of heat and pressure whereby the segments and the segment frame are welded together along said adjacent edges.

12. A process according to claim 11, wherein the cooled loose segments shrink to provide clearances between adjacent segments and between the segments and the segment frame and wherein upon being heated during the press-molding the segments expand to provide tight joints between adjacent segments and the segment frame.

* * * * *